Figure 5:
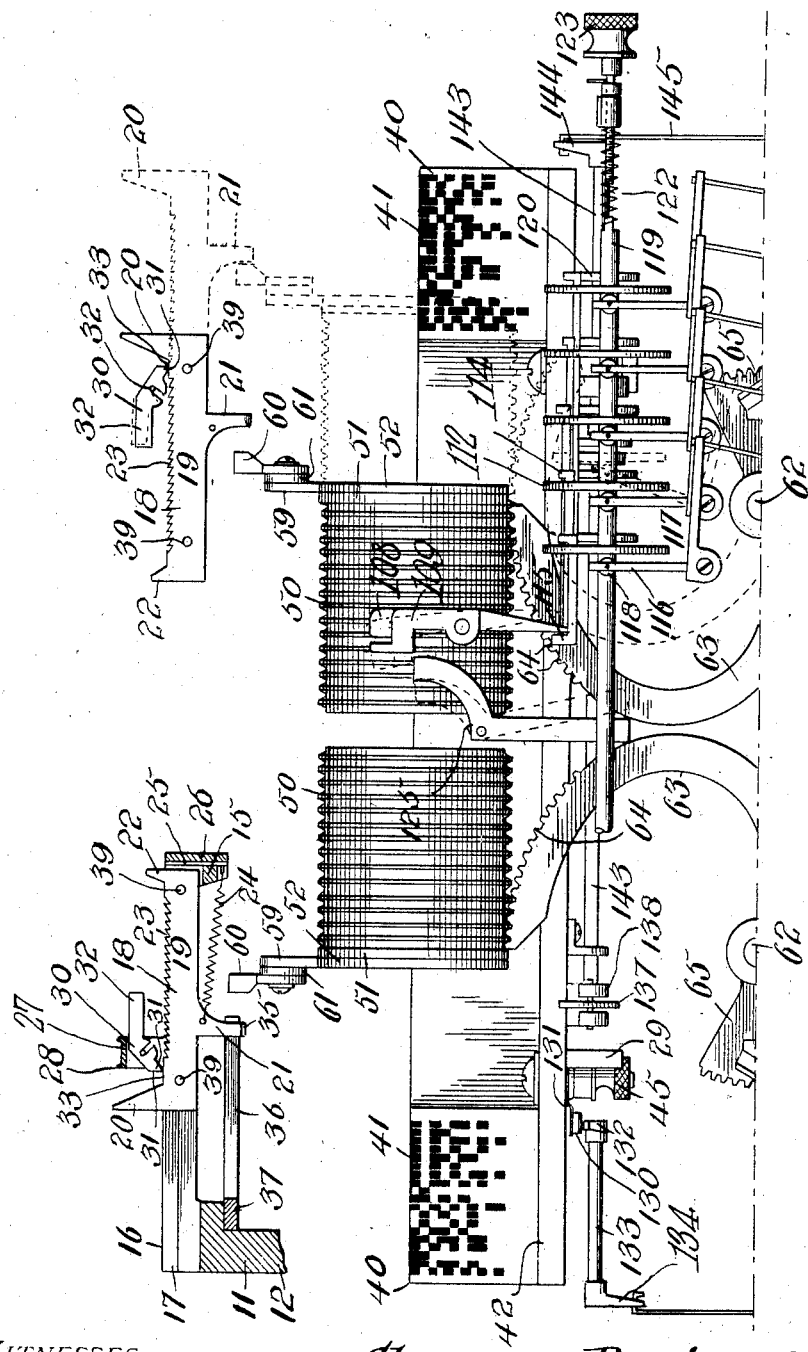

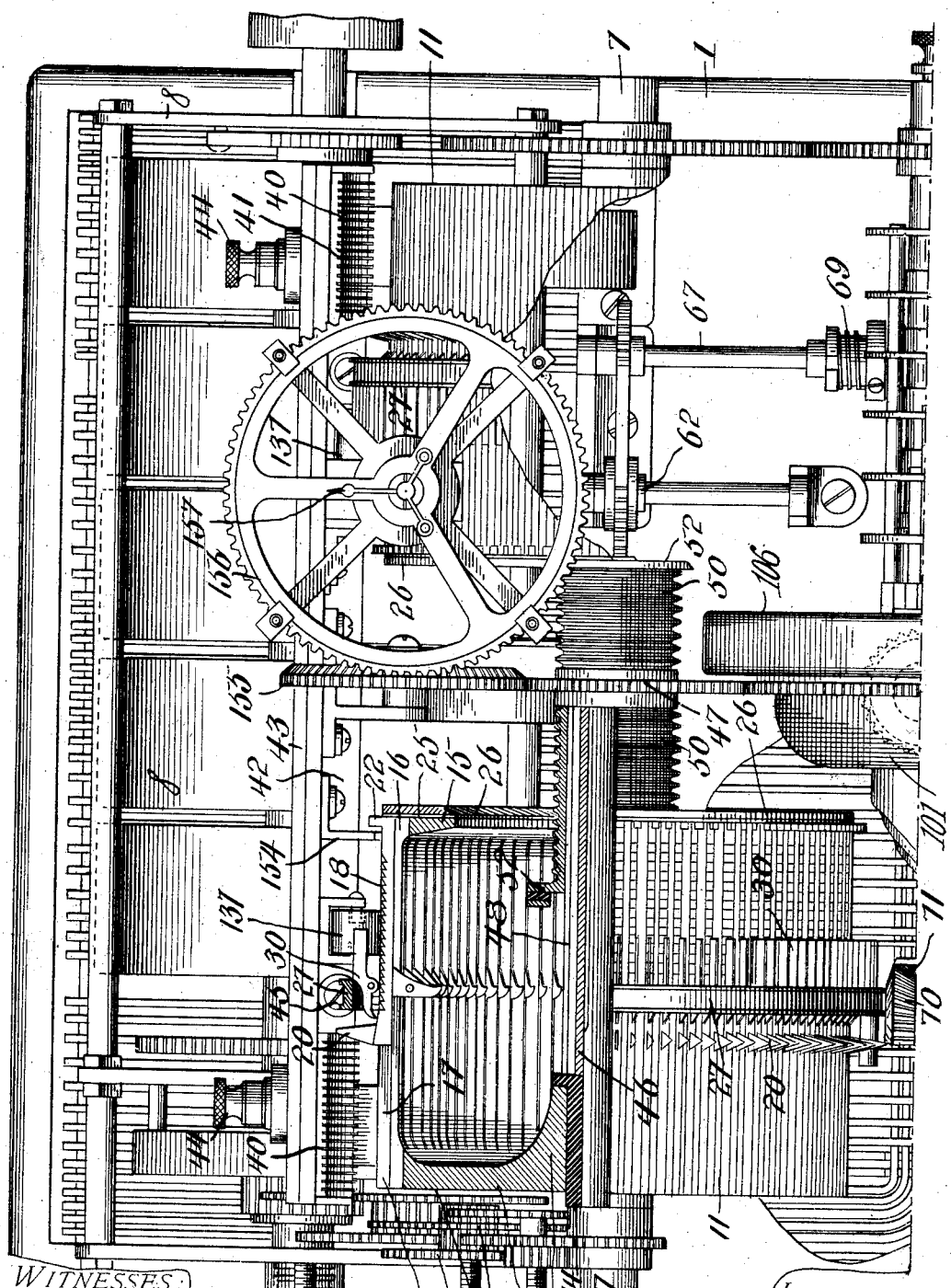

No. 879,357.　　　　　　　　　　　　　　　　　PATENTED FEB. 18, 1908.
C. BRAIN.
TELEGRAPHIC TRANSMITTER.
APPLICATION FILED MAY 15, 1907.

10 SHEETS—SHEET 2.

Clarence Brain, INVENTOR.

ATTORNEYS

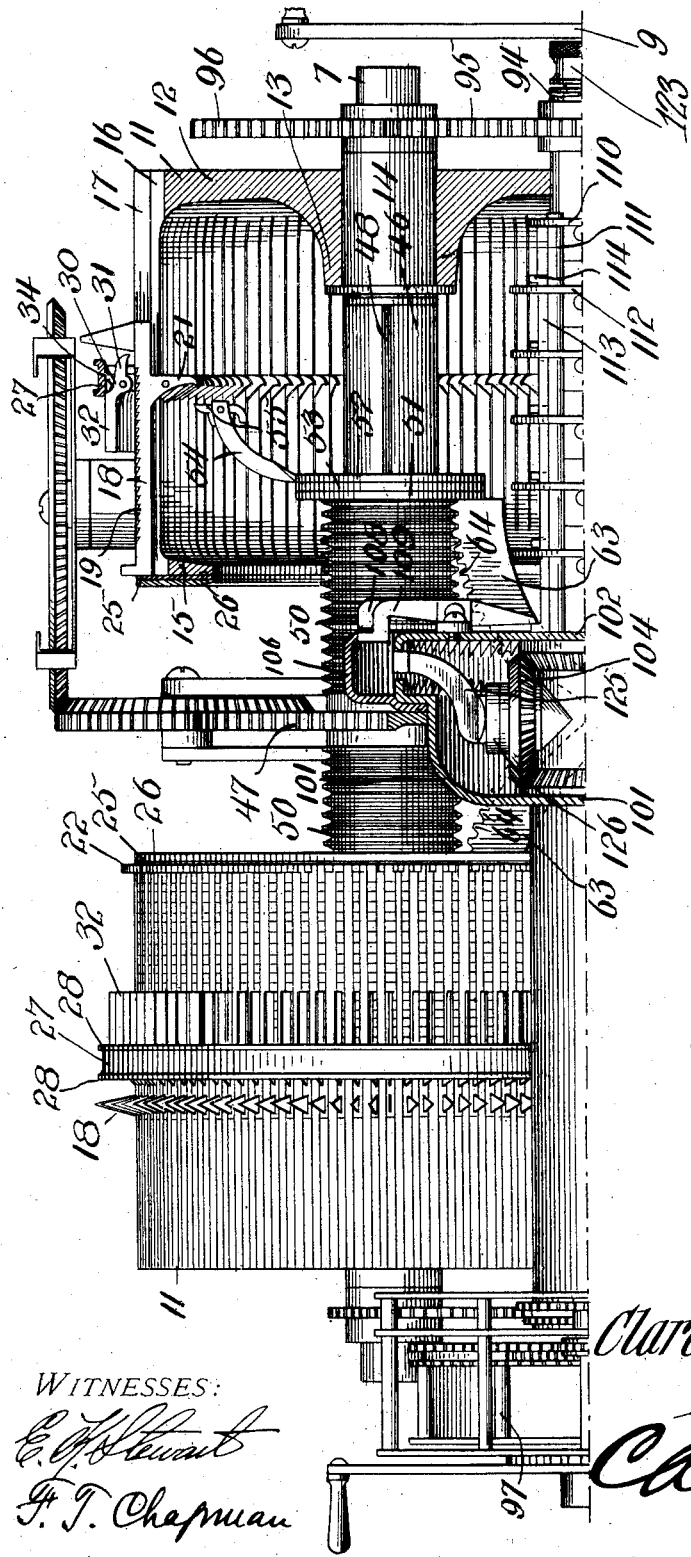

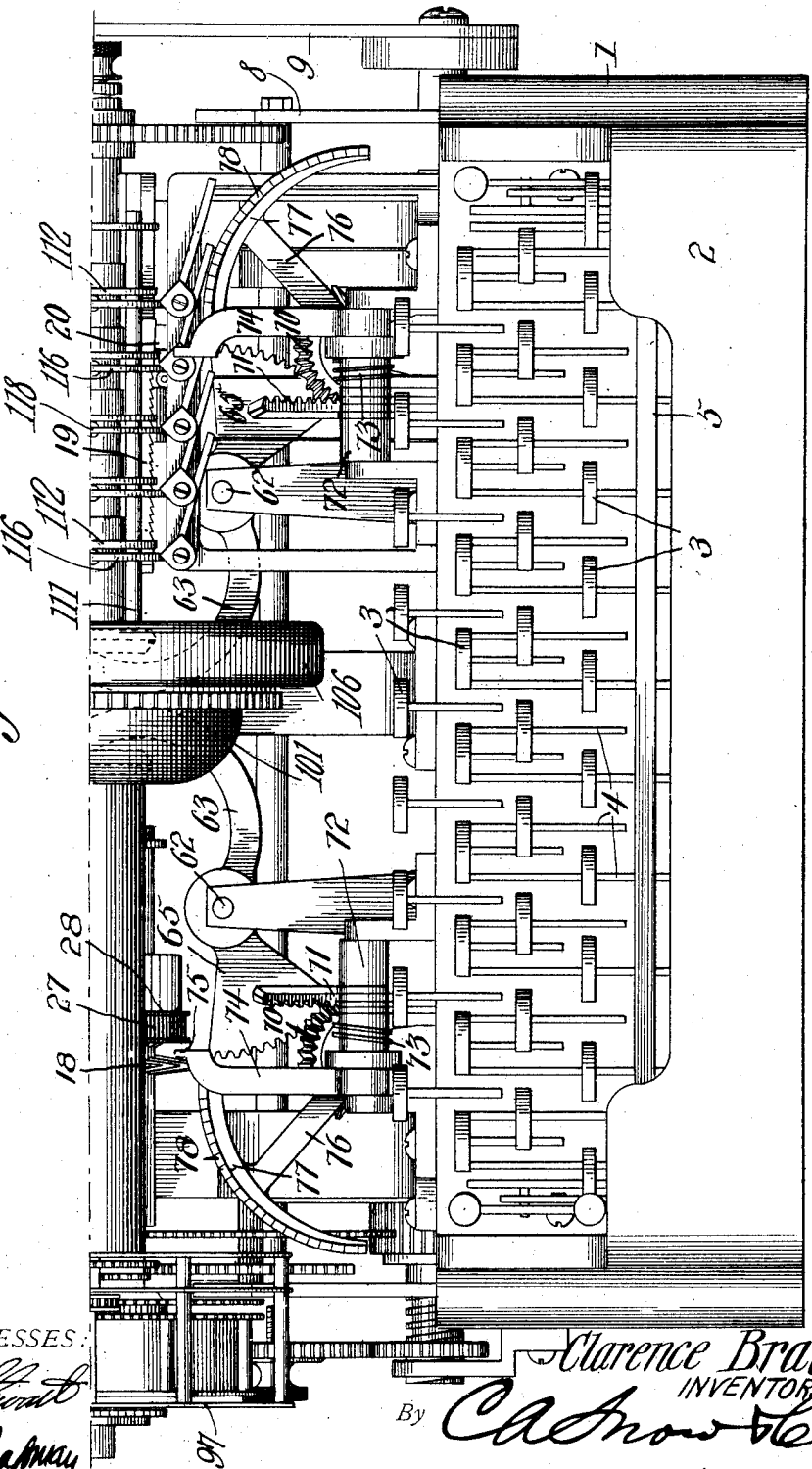

No. 879,357.

PATENTED FEB. 18, 1908.

C. BRAIN.
TELEGRAPHIC TRANSMITTER.
APPLICATION FILED MAY 15, 1907.

10 SHEETS—SHEET 5.

WITNESSES:

Clarence Brain, INVENTOR.

By

ATTORNEYS

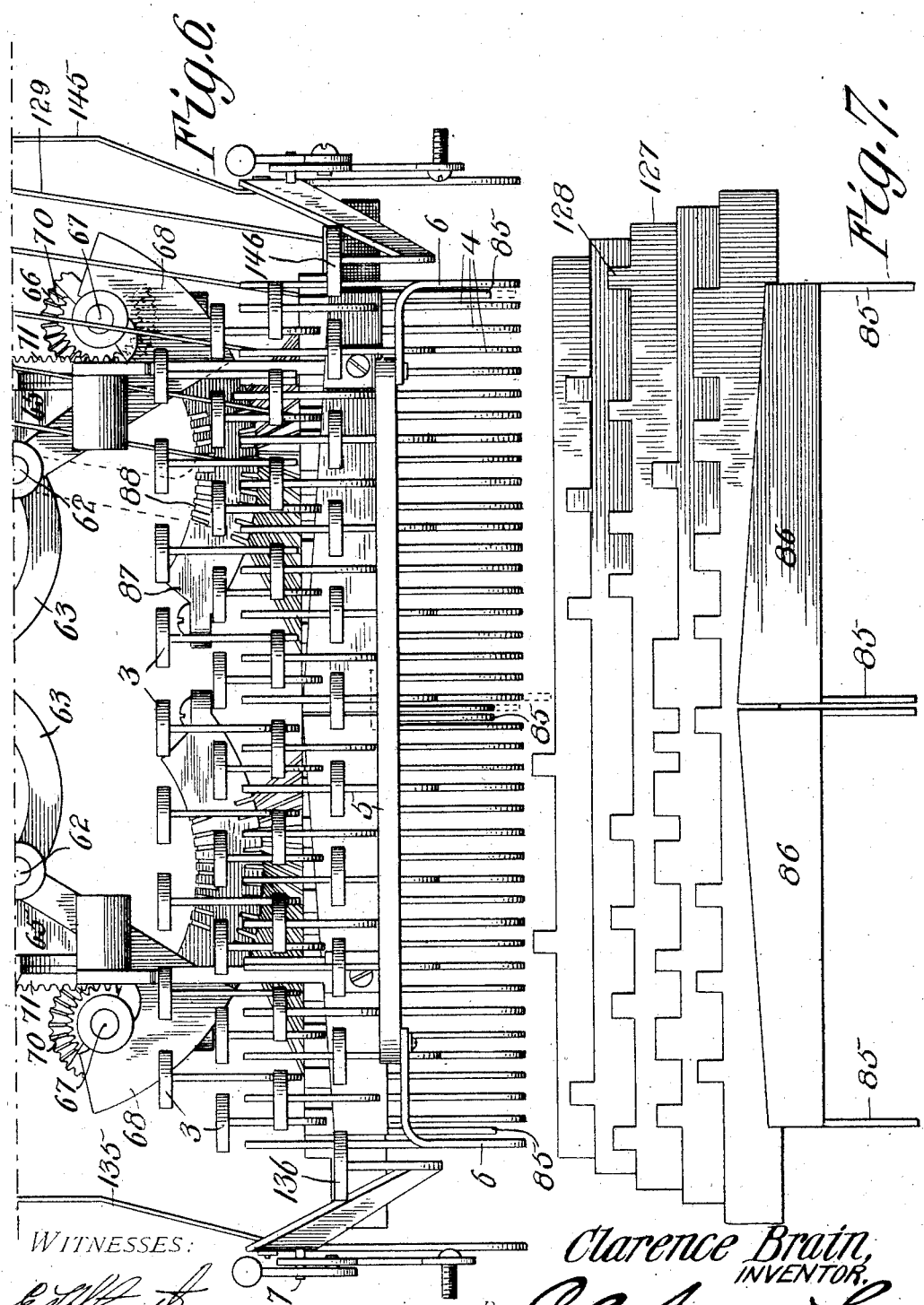

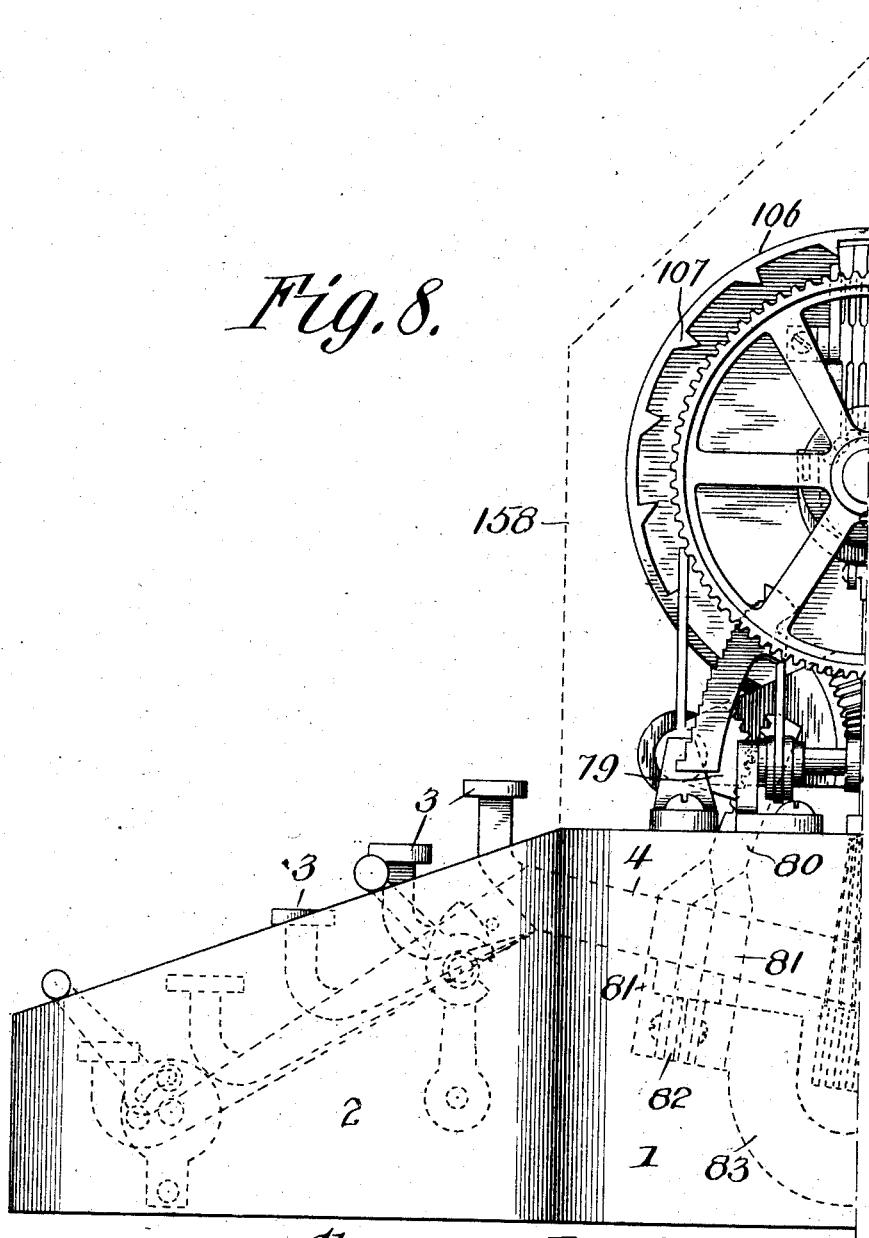

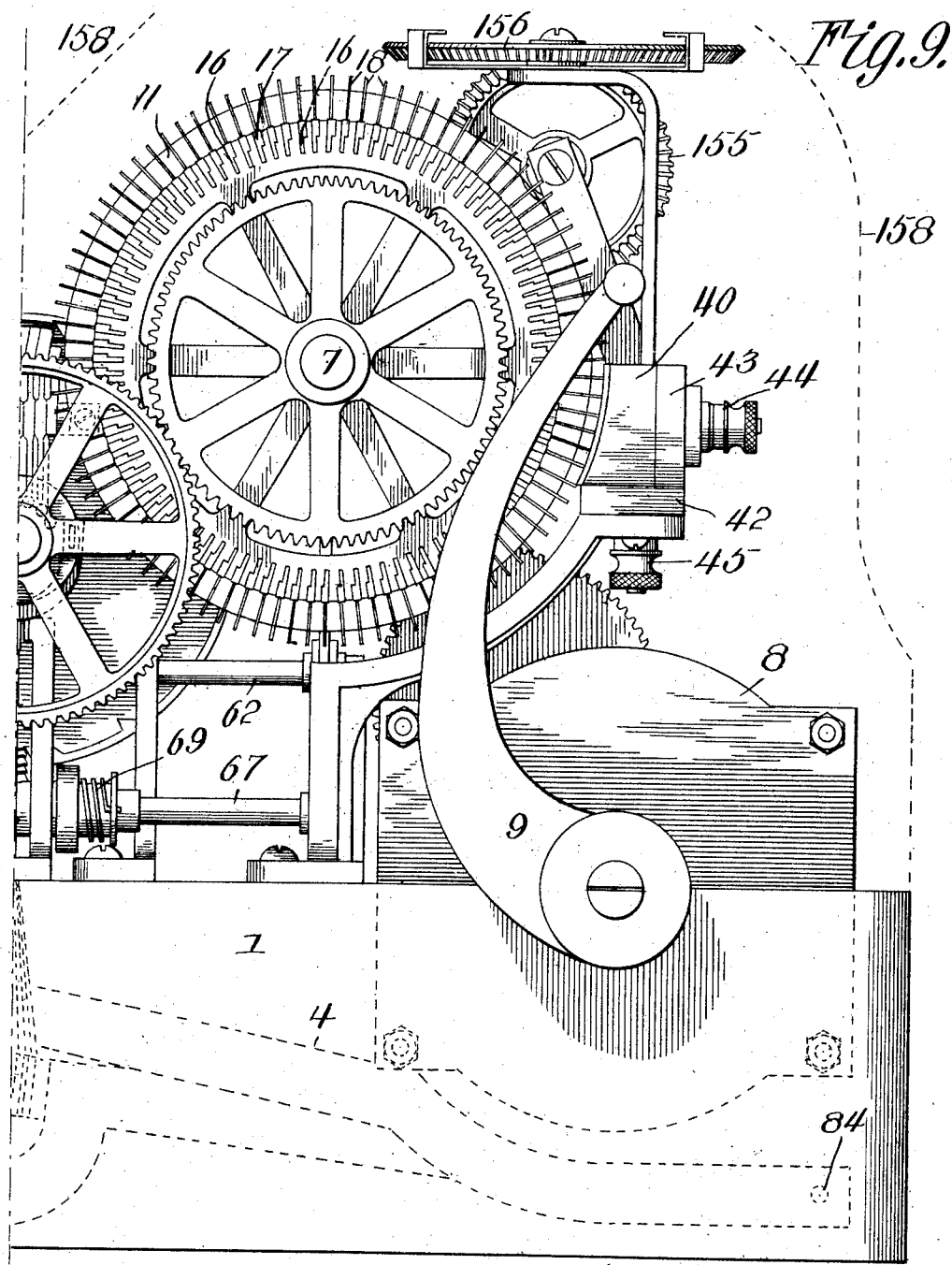

No. 879,357. PATENTED FEB. 18, 1908.
C. BRAIN.
TELEGRAPHIC TRANSMITTER.
APPLICATION FILED MAY 15, 1907.

10 SHEETS—SHEET 9.

Fig. 10.

WITNESSES:
E. F. Stewart
F. T. Chapman

Clarence Brain, INVENTOR.
By C. A. Snow & Co.,
ATTORNEYS

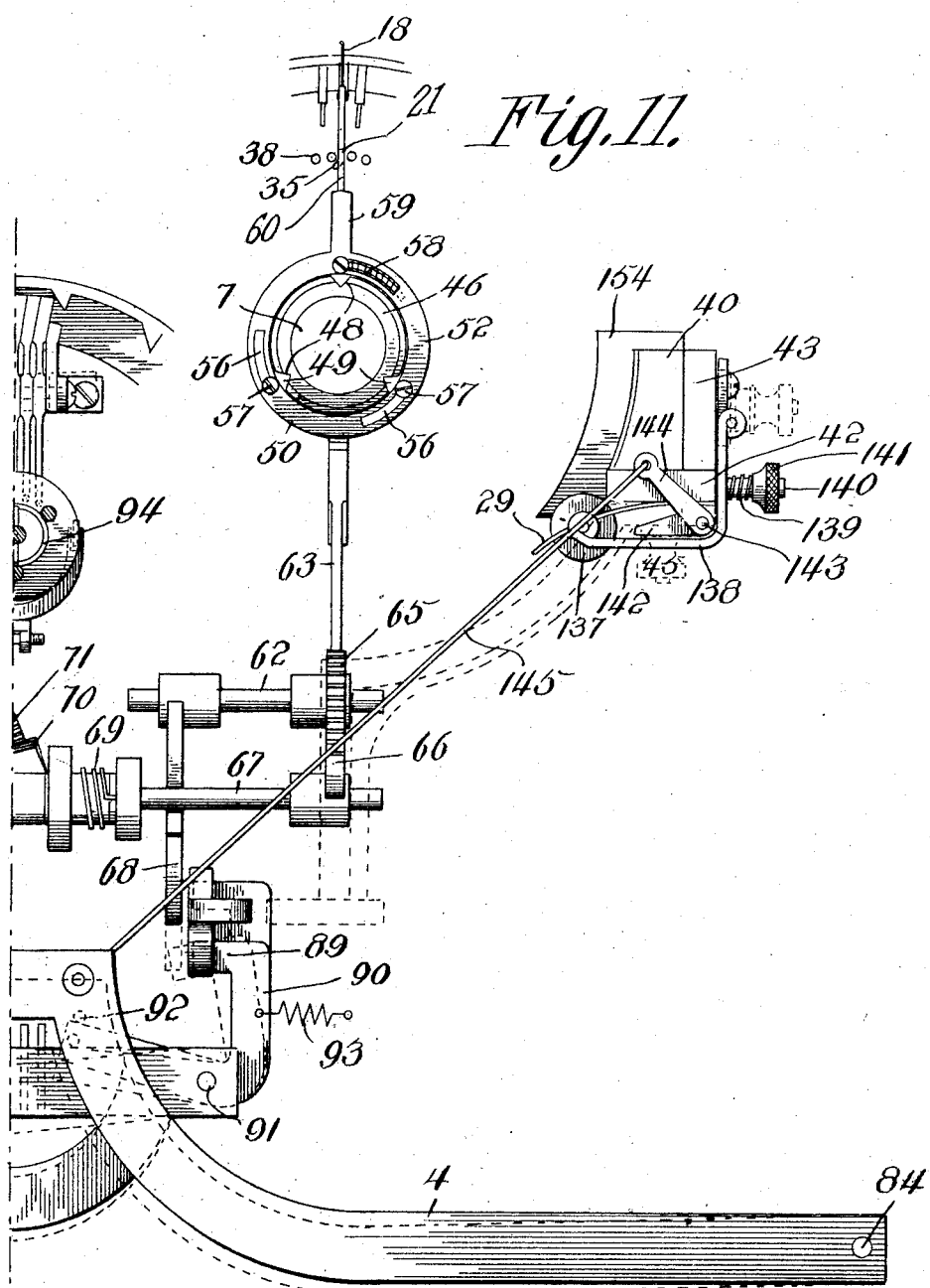

UNITED STATES PATENT OFFICE.

CLARENCE BRAIN, OF PARSONS, KANSAS.

TELEGRAPHIC TRANSMITTER.

No. 879,357.

Specification of Letters Patent.

Patented Feb. 18, 1908.

Application filed May 15, 1907. Serial No. 373,770.

*To all whom it may concern:*

Be it known that I, CLARENCE BRAIN, a citizen of the United States, residing at Parsons, in the county of Labette and State of Kansas, have invented a new and useful Telegraphic Transmitter, of which the following is a specification.

This invention has reference to improvements in telegraphic transmitters of the mechanical or automatic type; that is, where the operator by depressing the keys causes the indications of a code such as the Morse code to be automatically imposed upon a line for transmission to a distant point.
The purposes and objects of the present invention will be more fully understood if the difficulties which have been found to be present when it has been endeavored to utilize the mechanical transmission of telegraphic signals be first considered.

As is known, the letters and characters used in the telegraphic code require different lengths of time in transmission, the unit of length being the "dot" and the time element of this "dot" is determined by the speed of transmission. Theoretically, the time space between two consecutive dots is equal to that of the dot. Again, the theoretical length of a "dash" is that of two dots, and the theoretical length of a "space" is that of a dash or two dots. Now, in examining the Morse code it will be found that the characters vary in length from one unit for the letter E to thirteen units for the punctuation mark known as the period. In order that the words may not be made up of one continuous string of dots, dashes and spaces, and that each character may stand out clear and distinct in sound from the other characters, it is necessary that a time space slightly longer than that between two consecutive dots be left between the letters in a word, and a still longer time space be left between the words in sentences. Also, the code signals for certain letters employ spaces in their make-up, as, for instance, the letters C, R, O, Y and Z. These letters and also, under some circumstances, E and I, require slightly longer spaces between them than the following or preceding letters since they are liable to form combinations easily mistaken for other letters or, should they follow each other in a word, they may be mistaken for other words.
Now, the cleanness or crispness of telegraphic transmission is largely due to the proper time spacing between characters and the words made up therefrom. To the skilled telegraphic operator the telegraphic code becomes at the receiving end to all intents and purposes a spoken language, and a clean cut transmission will be received with the same facility that spoken words, clearly and distinctly enunciated, are heard and understood without effort by a listener. When one considers that the average length of time required to make each letter and its attendant space in fast telegraphic transmission is only about one-fifth of a second, it will be seen that the slight prolongation of the time space between letters becomes very little indeed. It will thus be apparent that great skill is needed for the manual transmission of telegraphic signals when it is attempted to attain a high speed of transmission, and when once attained the majority of skilled operators seem unable to maintain the required speed and accuracy for more than a few years since they soon lose control of their muscles. There is therefore a limit to the high speed transmission of telegraphic signals manually, and this speed is not increased by using mechanical transmitters where the spacing is left to the judgment or the ability of the operator, for with mechanical transmitters the required nicety of judgment of time and skill of control of "fingering" are attained by a very small percentage of the operators. This renders the result in most cases uneven and jerky and the receiving operator is often uncertain of the words or letters being received. While with mechanical transmitters the letters themselves may be sent at high speed, the inability to properly space the same results in a loss of speed and in uncertain and inaccurate transmission.

Now, it is the prime object of the present invention to provide a mechanical transmitter under the control of an operator wherein the spacing is also provided for by the mechanism and the operator has nothing to do but to depress the necessary keys representing the letters of the words he wishes to transmit.

By means of my invention each letter of a word and each word stands out distinct and clear from each other letter and word and the "enunciation" of the receiving sounder is clear and distinct and is easily understood for it is of machine like accuracy.

The invention consists essentially of a keyboard similar to that used on typewriters with keys having the various letters of the alphabet and other necessary characters thereon and mechanism under the control of the keys for bringing the contact-making devices into operative relation so as to transmit the proper code signals over the transmission line to a distant receiving point, and with other means operated by the depression of the keys to positively and accurately determine the spacing between the letters and words to be transmitted, the said spacing being entirely mechanical in operation and not at all under the control of the operator of the keyboard. It is consequently possible to attain the best results as to speed and accuracy and a distinct, clear-cut reproduction, and, therefore, easily understood reception of the telegraphic signals. Because such results are obtainable by eliminating every element of skill on the part of the operator except the ability to manipulate the keyboard, the poorest operator can transmit as well as the best operator can with the means heretofore under his control, while the best operator can materially increase his speed of transmission. In fact, a person without any knowledge of telegraphy might be able, with a machine constructed in accordance with my invention, to send a message perfectly. Also, operators who have lost their skill through years of service will be able by the mechanical transmitter of my invention, wherein high skill is unnecessary, to more than restore their former skill.

Now, while I have stated that the prime object of the present invention is the production of a means for mechanically effecting the proper spacing of the letters and words, it is to be understood that such statement merely covers the invention in its broadest aspect.

The invention comprises many other features and many details of construction which will be fully set forth in the following detailed description and illustrated in the accompanying drawings forming part of this specification, in which,—

Figures 1 and 2 combined show a plan view, partly in section, of a machine constructed in accordance with my invention; Figs. 3 and 4 combined show a front elevation, with parts in section, of the structure shown in Figs. 1 and 2; Figs. 5 and 6 combined show a front elevation of the machine, with certain parts omitted and other parts shown in section; Fig. 7 is a detail view showing the means for rendering the stroke of the keys uniform and for providing for the proper spacing; Figs. 8 and 9 combined show a side elevation of the machine; and Figs. 10 and 11 combined show a side elevation of certain portions of the machine, with some parts broken away and other parts omitted, and also showing certain parts in dotted lines and other parts in different phases of their operation.

Referring to the drawings, there is shown a base frame 1 upon which the mechanism is mounted, and this frame corresponds in shape and structure to that of an ordinary typewriter frame, and it is also provided with a front extension 2 inclosing a bank of keys 3 each of which is mounted upon the end of a key lever 4, to be hereinafter described, and this frame 2 also incloses a space bar 5 mounted on the ends of levers 6—6, all after the manner of an ordinary typewriter. These parts will, however, be more specifically referred to hereinafter. Mounted upon the main frame by means of suitable standards rising therefrom, but which have been omitted from the drawings for the sake of clearness, is a shaft 7, best shown in Figs. 1, 3 and 9. This shaft receives motion from a motor indicated by the casing 8, which will be understood as inclosing a spring motor, the spring of which may be wound up by an appropriate lever handle 9. The structure of this spring motor is not shown in the drawings, since it forms no part of the present invention and any suitable spring motor may be used. Or, if desired, this spring motor may be replaced by a suitable electric motor. A transmission gear train for transmitting motion from the motor 8 to the shaft 7 is illustrated in Fig. 1 and is designated generally by the numeral 10, it being understood that the motion of the shaft 7 is properly timed to rotate with a speed to perform the operations to be hereinafter described.

Upon the shaft 7 are mounted two drums or cylinders 11, one near each end thereof and in all respects duplicates one of the other, and, consequently, in describing these cylinders it will be understood that the description of one applies to the other. Each cylinder has formed at one end a solid web 12, Fig. 1, or a spider, Fig. 9, terminating at its inner end in a hub 13 mounted upon the shaft 7 through the intermediary of an insulating sleeve 14 in such manner that there is no electrical connection between the drum or cylinder 11 and the shaft 7. The other end of the cylinder 11 is formed with an inwardly-projecting, annular flange 15. The peripheral portion of the drum is formed with a number of radial slots 16 extending axially throughout the length of the drum and the slots also extend from the exterior surface of the drum to the interior thereof except at the web 12 and the annular flange 15. It will be observed that the structure of these cylinders as shown in Figs. 1 and 3 differs in some minor details from that shown in Fig. 5.

The cylinders or drums 11 are best shown in Figs. 1, 3, 5, 9 and 11, together with certain parts coacting therewith, and reference will be made more particularly to these figures in the detailed description of the drums or cylinders.

The slots 16 are wider at their outer ends 17 than at their inner ends where they cut through the inner wall of the cylinder and open to the interior thereof. The purpose of this enlargement of the slots will presently appear. These slots are provided for the reception of contact brushes 18 made of sheet metal of a thickness to snugly fit the narrower portions of the slots 16. Each brush 18 is composed of an elongated body portion 19 having one end formed into a contact finger 20 extending radially outward from the surface of the drum or cylinder 11, while the body portion is confined entirely within the slot 16. Projecting radially into the cylinder from the body portion 19 is a tongue 21, and projecting radially outward from the body portion 19, from the end remote from that carrying the contact finger 20, is a lug or extension 22, while on the outer edge of the body portion 19 between the contact finger 20 and the lug 22 are formed a number of ratchet teeth 23. The brush 18 is normally constrained toward the inner end of the drum or cylinder 11, that is, the end remote from the web 12, by a spring 24 fast to the inwardly-extending flange 15 at one end and to the tongue 21 at the other end. The end of the brush abuts against an annular buffer 25 of soft material held against the flange 15, so as to cover the corresponding ends of all the slots 16, by an annular ring 26 appropriately fastened to the drum 11 at this point.

Each finger 20 has the middle thereof between its extreme tip and its junction with the body portion 19 of the brush milled away until its thickness is sufficiently reduced to make the finger quite elastic in order that the extreme tip may engage and make elastic contact with certain contact blocks to be hereinafter referred to. The extreme end of each finger 20 is left of its original thickness in order to provide for the wear due to the rubbing action thereof over the contact blocks.

Surrounding each drum 11 midway of its length is a ring 27 formed at its edges with short, outwardly-extending flanges 28, and this ring 27 is engaged by a contact brush 29 (see Fig. 11), whereby electrical contact is established with the drum 11. It will be understood, of course, that each drum is provided with a ring 27 engaged by a contact brush 29.

The ring 27 is appropriately supported by the drum 11 and carries as many pivoted pawls 30 as there are brushes 18. These pawls are each provided at one end with a tooth 31 and at the other end with an extension 32, the function of which will appear further on. When the brush 18 is in its normal position in the slot 16, that is, with the end carrying the lug 22 in contact with the buffer 25, the tooth of the pawl rides upon a plain portion 33 of the body 19, but when the brush 18 is moved in the slot 16 toward the front end of the drum 11 against the action of the spring 24 the tooth 31 of the pawl 30 will engage a tooth 23 of the body 19 of the brush 18 and a spring 34 between the pawl and the ring 27 as indicated in Fig. 3, or otherwise located, is provided for the purpose of urging the pawl into contact with the teeth 23 when the latter are moved under the toothed end of the pawl. It will be observed that, as shown in Figs. 1 and 3, the tongues 21 have their inner ends curved in the plane of travel of the brushes 18, but in the structure shown in Figs. 5 and 11 the inner ends of these tongues are curved in a plane at right angles to the plane of travel of the brushes 18, as indicated at 35. In the structure shown in Figs. 5 and 11 the tongues 21 enter slots 36 in a guiding cylinder 37 fast on the interior of the closed or outer end of each drum 11 so that the slots 36 are parallel with the slots 16 and at such a distance interior thereto as to receive the tongues 21 with the grooved ends 35 interior to the cylinder 37. These slots 36 may be cut directly into the cylinder, as indicated in Fig. 5, or they may be simply the spaces between equally spaced pins 38 either coming from a cylinder 37 or directly mounted in the solid web 12 forming the closed end of the drum 11. These are merely structural variations, the functions remaining the same in each instance. The purpose of the structure just described will appear further on. In order that the brushes may be moved in the slots with the minimum of friction, they are each perforated near the ends and these perforations receive balls 39 which engage in the wider portions 17 of the slots 16, which wider portions therefore constitute ball races for the brushes 18.

Arranged in operative relation to each drum 11 there is a block 40, shown in Figs. 1, 5, 9 and 11. This block is made of some good conducting material such as copper or brass and the face contiguous to the corresponding drum 11 is shaped to the arc of a circle having its center coincident with the axis of the corresponding drum 11.

The curved metal face of the block 40 is in the path of the contact fingers 20 of the corresponding drum or cylinder 11 when these fingers are moved from their normal position toward the outer end of said drum or cylinder. The curved face of the block 40 is cut away where it is desirable that the fingers 20 shall not make electrical contact, and this cut-away portion may be filled with suitable insulating material flush with the face of the block.

The face view of each block 40 is best shown in Fig. 5. For convenience of illustration, those portions of the block which project into the paths of the fingers 20 are shown black, and when these black rectangles are read from the top toward the bottom it will be seen that they represent various characters of the Morse code. No attempt is made in the drawings to show the insulating material, but it will be understood that these black rectangles, to which the numeral 41 is applied, represent the projecting portions of the block 40 with which the brushes make contact and all the spaces between these black portions will be filled with insulating material to make the surface of the block a plane surface over which the brushes may ride without snapping from one contact projection 41 to the next. There will also be as many teeth 23 on the body portion 19 of each brush 18 as there are separate characters represented by the projections 41 on each block 40.

The blocks 40 are supported upon plates 42 of insulating material or of metal from which the blocks 40 are suitably insulated and are backed by other plates 43 of insulating material, or from which the blocks 40 are suitably insulated, so that these blocks are thoroughly insulated from the other portions of the mechanism, and each block is in electrical contact with a binding post 44 mounted on the plate 43, while the contact or collecting brushes 29 before referred to are each mounted on an insulating plate 42, but suitably insulated therefrom when the plate 42 is of metal, and are in electrical contact with a binding post 45.

Between the inner ends of the insulating bushings 14 the shaft 7 is surrounded by a tubular shaft 46 carrying at its center a gear wheel 47 midway between the contiguous ends of the two drums or cylinders 11, which two ends are spaced apart for a distance as shown. The purpose of this gear wheel 47 will hereinafter appear. On each side of the gear wheel the hollow shaft 46 is provided on its exterior with V-shaped splineways 48 extending longitudinally throughout the length of the shaft and equidistantly spaced around the same, there being three shown in Fig. 11 of the drawings. In these splineways rest splines 49 formed on the inner faces of two cylindrical racks 50 extending into the interior of the drums or cylinders 11 through the open ends thereof. On those ends of the racks 50 within the drums 11 are formed annular flanges 51. In the structure shown in Figs. 1 and 3 these flanges carry rings 52 insulated therefrom by an insulating ring 53 and the rings 52 each carry an arm 54 terminating in a pawl 55 arranged to engage the tongue 21 of a brush 18 when the rack 50 is moved longitudinally upon the hollow shaft 46 in a manner which will hereinafter appear. The preferred form of this particular structure, however, is shown in Figs. 5 and 11 where the ring 52 is formed with arc-shaped slots 56 and is secured to the flange 51 by screws 57. The ring 52 is movable circumferentially with relation to the flange 51 because of the slots 56 but it is normally held in a certain relation thereto by means of one or more springs 58 confined within the slots 56. The ring 52 has formed on it a radially extending ear 59, to which is fixed a radially projecting stud 60 insulated from the ear 59 by an insulating washer 61. The stud 60 is adapted to enter any one of the slots 36 or spaces between the pins 38 before referred to, and engage the corresponding finger 21 of a brush 18. The racks 50 are rotated by the gear wheel 47, which latter receives motion in a manner which will hereinafter appear, and they are moved longitudinally upon the hollow shaft 46 in a manner which I will now proceed to describe.

Mounted upon a suitable portion of the framework are two rock shafts 62, each carrying upon one side of its axis a curved arm 63 having at one end a series of gear teeth 64 arranged on an arc of which the axis of the shaft 62 is the center. The gear teeth 64 mesh with the teeth upon the corresponding rack 50 so that when the shaft 62 is moved about its axis the gear teeth 64 engaging in the rack 50 will cause the same to move longitudinally upon the hollow shaft 46 but by reason of the cylindrical teeth upon the rack 50 the latter is free to be rotated at any time and will always be engaged by the teeth 64. Since the longitudinal movement of the rack 50 is limited and need only be coextensive with the necessary movements of the brushes 18 so that the latter may be brought into operative relation to any one of the series of projections 41 on the corresponding block 40, the number of teeth 64 on the arm 63 may be correspondingly limited and the arm 63 therefore performs the same function as a gear wheel.

The shaft 62 carries on the other side from the arm 63 a segmental gear 65 meshing with a corresponding gear 66 on another rock shaft 67, also suitably supported upon the frame of the machine. The rock shaft 62 may also be provided with a depending arm 68 for a purpose to be described later. The shaft 67 may, in order to take up shocks, be connected by a spring 69 to a beveled segmental gear 70, mounted on the shaft and meshing with another segmental gear 71 fast on another shaft 72 likewise having a spring connection 73 to an arm 74 mounted on the shaft 72 and having its free end formed with a tooth 75. The shaft 67 also carries an arm 76 having at its outer end an arc-shaped frame 77 having one edge stepped, as indicated at 78, and in the path of the tooth 75 on the arm 74 so that when the parts are moved in a manner to be described the tooth 75 will be stopped by one of the steps 78, and this step portion is so located as to present constantly approaching steps for the tooth

75 to engage with so that the extent of travel of the arm 74 may be in accordance with the position of any particular step 78 in the path of the tooth 75. The shaft 72 and the various parts connected therewith or to the racks 50 are all under the control of the keys 3 and their levers 4.

Each shaft 72 carries two segmental gears 79, one fastened to the beveled gear 71 which, in turn, is fast on the shaft 72, and the other gear 79 is secured to the arm 74 by the spring connection 73. The arm 74 and the gear 79 fast thereto move around the shaft 72 as an axis. There are two gears 80 each engaged by a corresponding segmental gear 79 and these gears are each connected by an arm 81 to a separable bar 82. There are four bars 82, two on each side of the machine, and these bars have their upper edges slanted in the manner to be described with reference to Fig. 7, but in opposite directions, so that when a key lever 4 engages and depresses the bars 82, the latter will have different extents of movement. Hence, one gear 79 will be moved a certain distance and the other gear 79 will be moved another distance depending upon the relative point of engagement of the key lever 4 with the two bars 82. Now, one gear 79 actuates the stepped frame 77, and the other gear 79 actuates the arm 74 carrying the tooth 75. Consequently, the movements being properly timed by the relative points of engagement of the key levers with the bars 82, the tooth 75 will engage a proper step on the frame 77. The purpose of this variable movement of the frame 77 is to transmit longitudinal movement of the corresponding rack 50 on the shaft 46 for a certain distance for a purpose which will hereinafter appear. The construction, however, which I prefer to use for this purpose, and which is illustrated in a slightly modified form from that shown in the other figures, is found in Figs. 7, 10 and 11. The gear 80 is secured to crossed arms 85 pivoted at their rear ends to a fixed portion of the frame 1. The arms 85 support two bars 86, one for each side of the machine, and, therefore, duplicates one of the other, and these bars 86 are in the paths of the key levers 4 which, in this instance, have their main portions horizontal and then cross downward and backward to the pivot point 84, while the front portions of these key levers are bent downward, as indicated, so that the keys 3 may be located in convenient position for manipulation. The bars 86 have their upper edges slanting downward from the middle of the machine toward the ends so that the extent of movement of the keys up and down may all be the same, but the extent of movement of the rack bar 80 and the consequent throw of the cylindrical rack 50 will be varied in accordance with the amount of movement imparted to the respective bar, 86, the upper edge of which is at different distances from the engaging edge of the key fingers according to the position of the key on the keyboard. The two bars 86 take the place of the stepped frame 77 shown in other of the figures.

Located immediately adjacent to and at one side of the path of each counterweight arm 68 carried by each shaft 62 there is a segmental plate 87 having slots 88 on each edge. These slots receive the angle ends 89 of levers 90 pivoted at a fixed point 91. The levers 90 extend beyond the pivot point at an angle to the main portion of the lever each into the path of a pin 92 appropriately located on the respective key lever 4. A spring 93 tends to hold the lever 90 in such position that the end 89 while resting in its slot 88 does not project beyond the front face of the plate 87. Now, when a key is depressed the corresponding lever 90 is engaged by the pin 92 and its end 89 is moved into the path of the depending arm 68 and this acts to limit the movement of the shaft 62 and through it the extent of movement of the cylindrical rack 50, so that these parts cannot be moved beyond a certain point under the influence of the momentum imparted to them by the quick depression of a key.

It will be understood, of course, that all the parts described are properly proportioned and timed in operation to perform the functions ascribed to them. It will also be apparent from the foregoing that the throw of the rack 50 will cause it to carry the lug 60 into engagement with the tongue 21 on the brush 18 and move the same against the action of the spring 24 toward the outer end of the respective drum or cylinder 11. The extent of this movement will be determined by the relative position of the key lever 4 along the bar 86. The brush 18 will be locked in the adjusted position by its pawl 30 engaging in one of the teeth 23, and these teeth being equal in number to the number of vertical series of projections on the block 40 and also being appropriately located with reference thereto, the contact finger 20 will be so located that when the drum or cylinder 11 is rotated this contact finger will engage some one of the series of projections 41 and make electrical contact therewith. The keys are so located and named and the contact projections 41 are so arranged that the brush finger 20 will be carried over a proper series of projections 41 to throw upon the transmission line a series of impulses corresponding to the accepted telegraphic code for the letter represented by the key depressed. Of course the projections 41 are arranged to transmit these impulses with mathematic exactness, and, consequently, so far as the indications for a single letter are concerned, the impulses are sent with the desired precision. If, now, the keys are depressed in the proper order to spell a word, the brushes 18 will be adjusted one after another on one or the other of the drums or cylinders in the proper sequence to transmit these letters, but if the spacing between the letters be left to the judgment of the operator, there is liability of the overlapping of the impulses or of such extent of time between the letters as to produce either a confused or unintelligible reception of the message or a slow and uneven reception, without the necessary prolongation of the time interval between letters and the longer time interval between words as compared with the time interval between dots and dashes, and which will serve to confuse or render unintelligible the reception of the transmitted message. Now, in order to so adjust the brushes 18 upon the cylinders or drums that there shall be no overlapping of the code signals for the letters, and so that those groups of impulses representing code letters shall be spaced in proper sequence, and also so that the words shall be properly spaced, there is provided a mechanism which I will now proceed to describe.

By considering the space between the letters in a word as part of the letters themselves, and also considering the slightly longer spaces for certain letters, which I have heretofore named, it is found that a code can be formed consisting of five different lengths of characters made up of four, six, eight, ten and twelve units. It is, however, necessary to slightly alter the value of the units in a few letters, but this can be done without affecting the sound to any material extent and it greatly simplifies the construction of the automatic spacing mechanism. Since this spacing is not of the uniform character found in typewriters, I have devised a means for producing the varying spacings between the sounds which is entirely outside the volition of the operator, and, therefore, the transmission of the messages becomes mechanically perfect. Before, however, proceeding with the description of this part of the invention, attention is called to the fact that the length of characters adapted for the machine herein described varies in multiples of two. It follows, therefore, that the brushes 18 may be placed about the circumference of the cylinders or drums a distance of two units apart and that a large number of brushes may be so placed. It also follows that with a large number of brushes at the command of the operator, he can strike several keys and place brushes for making corresponding characters before the cylinders are so full of placed brushes that the signals will begin to overlap. Now, by providing a means for locking the keys when the cylinders or drums have reached their capacity, and by providing a scale whereby the operator has visual indication as to how near he is to the capacity of the drums or cylinders, it is possible for the operator to strike the keys without regard to the careful spacing required by the telegraphic code and he has only to maintain an average speed equal to that at which he desires to send the message.

In order to rotate the cylindrical racks 50 to the extent necessary to place the lugs 60 in proper coincidence with the brushes 18 so that when one brush has been placed in position to make contact with the proper set of contact projections 41 the next succeeding brush will be placed in such time relation to the first brush that the signals will not overlap but will follow in the proper time sequence, there is provided a shaft 94 extending throughout the width of the machine, preferably to the front of the main shaft 7, and connected through gears 95 and 96 to the main shaft 7 for rotation at the same speed as the drums 11. At the other end of the shaft 94 from that where it is connected to the shaft 7 this shaft 94 carries a spring motor 97 connected and giving motion to two concentric sleeves 98 and 99 surrounding the shaft 94. These two sleeves extend to near the center portion of the machine and the inner one of the two sleeves, that is, the sleeve 98, carries a bevel pinion 100, while the outer sleeve carries an overhang crown ratchet wheel 101. Opposed to this crown ratchet wheel is another crown ratchet wheel 102 carried upon a bevel pinion 103 mounted to rotate upon the shaft 94, and these two bevel pinions are connected for rotation in opposite directions by another beveled pinion 104. The shell portion of the crown ratchet wheel 101 carries a gear wheel 105 meshing with the gear wheel 47 on the shaft 7. Also carried by the crown ratchet wheel 101 is an overhanging annulus 106 having radially inward projecting teeth 107, and this annulus 106 with its teeth 107 constitutes an escapement wheel. The teeth of this escapement wheel are the maximum length of a character apart, that is, they are separated by a distance equal to the length of twelve units or the distance between six of the brushes 18. In order that this escapement wheel may divide the brushes evenly, each drum carries a number of brushes constituting some multiple of six. The crown ratchet wheel 102 carries a number of stop levers 108 and another stop lever 109, which latter constitutes a universal stop acted upon by the other stop levers 108. The stop lever 109 is shorter than the levers 108 so far as its distance from the pivotal point is concerned, but it projects to a greater extent toward the space between the two crown ratchet wheels than do the levers 108. The lever 109 has an angle tooth formed thereon projecting into the path of the teeth 107 of the escapement 106 so that the lever 109 may engage the teeth 107. The lever 109 is moved by the same actuating mechanism which moves each one of the levers 108, so that when any one of the levers 108 is moved the lever 109 participates in such movement. The two levers 108 and 109 thereby constitute a well-known type of step-by-step escapement mechanism, with the difference, however, that the extent of movement permitted by each operation of the escapement mechanism will vary in accordance with which one of the levers 108 is actuated with the lever 109.

The two crown ratchet wheels 101 and 102 are connected to the sleeves 98 and 99 and the bevel connecting gear through opposite ends of the spring motor 97 so as to rotate in opposite directions, but the stop lever 109 is normally in engagement with a tooth 107 of the escapement 106 fast upon the ratchet wheel 101. Consequently, under normal conditions, these two crown ratchet wheels are held against rotation with relation to the shaft 94 and, therefore, rotate with it. So, under normal conditions, the shaft 94 receiving motion from the shaft 7 will transmit this motion through the gear wheel 105 to the gear wheel 47 on the hollow shaft 46 and thus transmit rotary motion to the two cylindrical racks 50, which, under these conditions, rotate synchronously with the drums or cylinders 11. Thus it will be seen that there is no relative movement of rotation between the racks 50 and the drums or cylinders 11 so long as the escapement remains inactive.

Near the end of the shaft 94 where it carries the gear wheel 95 it carries a disk 110 which is connected to the crown wheel 102 by three equi-distant, stiff, steel rods 111. These rods support a number of disks 112, which may for convenience be termed clutch disks or clutches. Each one of these clutches 112 is connected to the respective lever 108 by a bar 113 passing freely through all the other disks but the one to which it belongs and there this bar is upturned at the end, as shown at 114, so as to be engaged by the disk when the latter is moved toward the right as viewed in Figs. 3 and 5. The other end of the bar 113 is likewise upturned, as shown at 115, behind the lower end of its respective lever 108. Each one of these disks is slidable longitudinally on the rods 111 under the control of the forked end 116 of a bell-crank lever 117. The forked end 116 carries anti-friction rollers 118 which bear against the faces of the clutch disks 112 on opposite sides of the center thereof.

The shaft 94 is made hollow and contains a rod 119, through which latter extends laterally a number of pins 120, which pins also pass through the walls of the shaft 94 and into the path of the clutches or clutch disks 112, and the shaft 94 is slotted, as shown at 121, for the passage of these pins 120, whereby the pins and the rod 119 may be moved lengthwise for a distance within the shaft. The rod 119 is under the control of a spring 122 and an adjusting thumb-nut 123 on the end of the shaft 94. Each clutch disk 112 has formed thereon a suitable hub 124 arranged to slide on the shaft 94.

A lever 125 is pivotally connected to a part 126 fixed to the shaft 94 and has one end passing into the hollow interior of said shaft through a slot in the rod 119 so as to participate in the longitudinal movement of said rod. The other end of the lever 125 is formed with a head or tooth normally engaging the teeth of the ratchet 102, but it is of such width that it will engage the teeth of the ratchet 101 before it releases the ratchet 102.

Returning, now, to the consideration of Figs. 7, 10 and 11, it will be observed that there is a series of bars 127, each provided on its upper surface with lugs 128 in the path of certain of the key levers 4. These bars 127, five in number, are connected to the bell-crank levers 117, also five in number, by links 129. It may be here noted that not only are there five bars 127 but there are five clutches 112 and five levers 108.

The operation of the spacing mechanism may now be described. Let it be assumed that the key for the letter B is depressed, as shown in Figs. 10 and 11 by dotted lines. The bar 127, which I may term the space bar, arranged for code letters of ten units in length, is also depressed by this key, thus operating the corresponding bell-crank lever 117. This will slide the corresponding clutch disk 112 into engagement with its respective pin 120 and actuate the rod 119 a corresponding distance. This causes the lever 125, which is in normal engagement with the ratchet 102, to move into engagement with the ratchet 101. At the same time a corresponding lever 108 is moved and by its movement actuates the stop lever 109 to move out of the path of a tooth 107 on the escapement wheel 106. The ratchet 102 is now free to revolve under the action of the spring motor 97 until caught by the lever 108 that has just been actuated to move into coincidence with a tooth 107 on the escapement 106. On releasing the key, the parts resume their normal position. This leaves the ratchet 101 free to revolve under the action of the spring motor 97 until the next succeeding tooth of the escapement 106 engages the lever 109 and this movement of the ratchet 101 is communicated by the gear 105 to the gear wheel 47 and through the shaft 46 to the cylindrical racks 50. This means that the racks 50 and the lugs 60 have been moved a distance in the particular instance under consideration equal to the length of ten units, so that when the racks are next actuated to push a brush 18 into operative relation in the respective cylinder or drum 11, this brush will be ten units distant from the one which was placed by the depression of the key representing the letter B. It will be understood that as viewed in the drawings the rotation of the ratchet 102 was counter-clockwise and that the rotation of the ratchet 101 was clockwise. It follows, therefore, that the rotation of the cylindrical racks 50 was counter-clockwise or in a direction opposite to that of the rotation of the drums 11.

The entire operation of the device so far as the placing of the contact brushes 18 and the sending of impulses therefrom to line, in order to cause the transmission of properly spaced letters thereon, will now be fully understood. Let it be supposed that the key representing the letter B is depressed as before. Its action is as follows. The key depressed will engage the bar 86. This will cause the rack 80 to be moved in a downward direction and will cause the shaft 72 to be rocked on its bearings through the engagement of the rack 80 with the segmental pinion 79 on said shaft 72. This movement of the shaft 72 is communicated to the shaft 67 through the intermeshing gears 70 and 71. From the shaft 67 motion is communicated to the shaft 62 through the intermeshing segmental gears 65 and 66 and the arm 63 is thus actuated and its gear teeth 64, being in engagement with the respective cylindrical rack 50, will cause the longitudinal movement of this rack on the shaft 46 through a distance sufficient to move the brush 18 in its path to a position to sweep over the particular series of contact projections 41 on the block 40 which will impress upon the line the impulses representing the code signals for the letter represented by the key depressed. Now, while this operation has been in progress, the key depressed has also engaged the projection 128 on a bar 127 in the path of this key and the particular bar 127 which will produce the proper spacing for the letter or character represented by the depressed key will be depressed with the key and the particular lever 117 connected to this bar will be moved in a direction to engage the proper clutch disk 112 and thus move its corresponding stop lever 108, at the same time causing the disengagement of the common stop lever 109 from the tooth 107 of the escapement 106 with which it was engaged, and the locking of the ratchet 101. As before described, the ratchet 102 rotates counter-clockwise until the particular lever 108 which has been actuated engages a tooth 107.

The movements thus far described have taken place on the depression of a key. Now, on the release of the key and while the parts are returning to their normal positions, the ratchet 101 is released by the lever 125 and begins to rotate under the action of the spring motor 97 but at this time the lug 60 has not been moved a sufficient distance to be free from the slot 36 in the cylinder 37 or from between two pins 38, according to which structure is used. Therefore, the ring 52 is held against rotation while the cylindrical rack 50 is rotated by the rotation of the ratchet 101, and this is permitted because of the slots 56. When the movement is completed and the rack 50 is returned to its normal position, the lug 60 will escape from engagement with the particular slot 36 or between the pins 38 and the spring or springs 58 will return the ring 52 to its normal position so that the lug 60 has been moved to a position to engage a brush 18 spaced a proper distance from the brush just actuated to bring it into action at the correct time interval after the first-named brush has made contact with the projections 41 on the block 40 and has sent the corresponding impulses to line. It will thus be seen that the spacing or time interval between the code signals representing letters or characters is entirely outside the control of the operator and must, therefore, be produced with the utmost mathematical exactness.

For producing the spaces between words, the space bar 5 is used. This is supported by levers 4 at the ends similar to the space bar of an ordinary typewriter. These levers are arranged to engage a proper one of the bars 127 but are too wide apart to engage a bar 86. The result is that the space bar will rotate both of the cylindrical racks 50 but will cause neither one of them to be moved longitudinally to engage a contact brush 18.

For convenience of construction, two cylinders 11 have been used, but these are identical in construction and are mounted for synchronous rotation upon the shaft 7 and all the slots 16 of one cylinder or drum 11 lie in the same longitudinal planes as the slots in the other cylinder 11. It will be observed that the spacing mechanism acts upon both cylindrical racks 50 at the same time and to the same extent so that there can be no overlapping of signals whether set to operate from one cylinder or the other.

It frequently happens that an operator has difficulty in "raising" an office for which he has messages on account of the operator at the distant office being engaged with some other work, and much time is thus spent in "calling." Now, my invention has provided means for retaining the contact brushes in the positions placed by the operator so that they will repeat the signals they are set for so long as the cylinders rotate. Under normal conditions these brushes are released from their set positions as soon as the signals have been transmitted, as will presently appear. By this repeating means an operator can strike the keys representing the "call" of the office he desires and "sign" those of his own office, adding such words as "rush" or any other signals recognized by the telegraph companies to indicate the character of the message. The machine will then automatically repeat these signals without further attention so long as the cylinders or drums are rotated. In addition to this means, the machine is provided with means for temporarily closing the circuit should the receiving operator desire to "break" or to impart some information, which means will also maintain the circuit closed when the machine is not in use.

In order to short circuit the machine, which, of course, corresponds to the sending key of an ordinary telegraph set, so that the distant receiving operator may "break" in the ordinary manner, the binding post 44 at one end of the machine may have connected to it a contact finger 130, and the adjacent binding post 45 has connected to it another contact finger 131, both of which are made of resilient metal, and the contact finger 131 is in the path of the contact finger 130. These contact fingers 130 and 131 are shown at the left-hand end of Fig. 5. They are actuated to make contact one with the other by means of a rock arm 132 fast on one end of a rock shaft 133 having at its other end another rock arm 134 connected by a link 135 to a key 136.

Now, in order to release the brushes 18 from the pawls 30, after these brushes have made contact with the projections 41 on the block 40, there is provided a roller 137 on the end of an angle arm 138 pivoted to the insulating block 43 and held in position by a stiff spring 139 on a stud 140 passing through said angle arm 138 and into the insulating plate or block 42, which stud is provided with an adjusting thumb-nut 141 for regulating the tension of the spring 139. This roller 137 in its normal position engages the ends 32 of the pawls 30 after the corresponding brushes have passed the contact block 40 and lift the noses or teeth of the pawls from contact with the ratchet teeth 23 on the brushes 18, and the latter are returned to normal position by the springs 24, ready to be again placed in the further operation of the machine.

Now, when it is desired to repeat or call, which means that the brushes remain in their placed positions for one or more additional rotations of the drums 11, there is provided a rock arm 142 so located as to engage the spring-retained angle arm 138. This rock arm 142 is on one end of a rock shaft 143, the other end of which carries another rock arm 144 connected by a link 145 to a key lever 4 actuated by a key 146 properly marked to indicate that it actuates the means for causing the machine to repeat. It will be seen that when the key 146 is depressed the rock arm 142 will move the roller 137 by engaging its angle supporting arm 138 to an extent to carry it out of the path of the pawls 30, and this key may be held down so long as desired. There is, of course, a roller 137 for the pawls on each drum 11 and a rock shaft 143 has an arm 142 properly located with reference to each angle arm 138 carrying the respective roller 137. These rollers may be quite wide, as indicated in Fig. 1, or narrow, as indicated in Fig. 5.

In order to lock either of the keys 136 or 146 the levers 4 carrying these keys are each provided with a pin 147 in the path of which may be located a catch lever 148 provided with a notch 149 mounted for rotation upon a stud 150 on the upper end of a rock arm 151 under the control of a spring 152. The catch lever 148 may be provided with a lug 153 to prevent the pin from being caught in the notch 149 when it is desired to hold the particular key lever in a depressed position by the finger of the operator only. When, however, it is desired to maintain it in the depressed position, the catch lever 148 is manipulated to cause the notch 149 to engage over the pin 147 and thus hold the particular key in the depressed position. A slight pull on the catch lever 148 against the action of the spring 152 will release this lever.

With a machine such as has been described, wherein the operator is not concerned with the spacing of either the letters or the words, he may proceed to place the brushes 18 as rapidly as he may desire and without regard to the speed of transmission; in fact, he may even place the brushes more rapidly than the characters are transmitted. Under the latter conditions the brush-placing mechanism will gain on the drums or cylinders 11 until the latter are full. Now, in order to prevent any further placing of the brushes so that the characters would overlap, there is provided a curved metal plate 154 fast upon the framework of the machine and arranged in the longitudinal path of the lugs 22 from a point slightly in advance of the point where the contact fingers 20 come into operative relation with the blocks 40 to a point just beyond or about coincident with the point where the brushes are released from the pawls 30 by the rollers 137. This plate will hold the brushes 18 from longitudinal movement and should the lugs 60 on either of the cylindrical racks 50 be moved into engagement with a brush during this portion of their travel with the drums 11, the particular brush or brushes, being locked against longitudinal movement, will not be actuated by the depression of the keys.

As a means for giving visual indication to the operator as to the position of the racks 50 with relation to the cylinders 11, there is provided a gear wheel 155 meshing with the gear wheel 47 and also provided with beveled teeth engaging a bevel gear 156 which may carry a pointer 157 or which may carry a suitable index, in which case the pointer 157 will remain stationary.

The entire machine may be provided with a suitable casing of any appropriate shape, and this casing is diagrammatically represented by the dotted line 158 in Figs. 8 and 9. It will be understood that since the major portion of the machine does not have to be touched by the operator, this casing may inclose practically all of the machine except the keyboard, the indicator under the control of the wheel 156, the winding crank 9, and such other similar parts as it may be necessary to expose for the proper operation of the machine.

Suitable provision may be made for controlling the speed of the motor 8 so that the rate of transmission may be set to suit the skill of the operator in manipulating the keyboard.

The electrical connections of the instrument will simply consist in connecting up the two binding posts 44 in multiple-arc and the two binding posts 45 in multiple-arc and these two sets of binding posts may be connected up to the line by a double conductor cord and plug or otherwise, as desired. The circuits through the machine have already been indicated, but it will be seen that the current will pass from the binding posts 45 to the brushes 29, to the rings 27, and thence by way of the cylinders 11 to the contact fingers 20, returning to the line by the projections 41, blocks 40 and binding posts 44.

Wherever it is possible to introduce ball or roller bearings to reduce the friction of the parts they will be used, but it has been considered unnecessary to show such bearings throughout the drawings as such showing would only serve to confuse the illustration.

Various changes of the parts may be made without departing from the invention, and some of these changes have already been mentioned in the foregoing description. Others will suggest themselves to the skilled mechanic.

It is, of course, obvious that the drums or cylinders might be stationary and the contact blocks 40 might revolve, or that the cylinders might be placed side by side, or upon vertical shafts and that in such latter case the contact brushes might be returned by gravity instead of by springs. In fact, many changes from the exact structure shown in the drawings might be made without in any way affecting the principle of the present invention, which is by no means confined to the exact details of construction shown and described.

In fast transmission, the inertia of the receiving relay and sounder must be considered. On starting to send a message the circuit is, of course, first opened. Now, before the distant sounder can "close" the relay armature must travel from its insulated back-stop to the front or active stop, but the sounder armature is released the instant the relay armature is. This can be remedied by making long dots, technically known as "heavy" sending. Theoretically, the spaces between consecutive dots or dots and dashes in a character have the same time value as the dot; therefore the inertia of the receiving instruments may be overcome to a great extent by shortening the spaces and making the dots and dashes proportionately longer. For fast mechanical transmission the blocks 40 may be made on this principle, and thus give better results and "carry" better on the average telegraph circuit.

I claim:—

1. In a telegraphic transmitter, a series of spaced contact brushes, means for moving the brushes into operative relation with series of contacts representing telegraphic code characters, and means for adjusting the space between successive active brushes to correspond to the time space of a telegraphic code character plus the separating time space between two characters.

2. In a telegraphic transmitter, series of circuit terminals representing telegraphic code characters, contact brushes therefor, means for moving the contact brushes into operative relation each with a series of contacts representing a code character, and means for adjusting each succeeding active brush to a position with relation to the preceding brush to come into contact with a series of code-character circuit terminals after a time lapse equal to the time period for the transmission of a character plus a separating time space between it and the next succeeding character.

3. In a telegraphic transmitter, series of electrical circuit terminals representing telegraphic code characters, other circuit terminals arranged to make contact in succession with the circuit terminals representing the code characters, and means for determining the time order of contact of the second set of circuit terminals with those circuit terminals which represent code characters to include a predetermined time space between each series of impulses representing a telegraphic code character.

4. In a telegraphic transmitter, a number of series of circuit terminals each of which series represents a telegraphic code character, a series of spaced contact brushes held normally out of alinement with the series of circuit terminals representing code characters, manually operated keys, one for each character, and connections between the keys and the contact brushes for moving any one of the latter into alinement with that series of circuit terminals representing the character corresponding to a key.

5. In a telegraphic transmitter, a number of series of circuit terminals representing telegraphic code characters, a number of spaced contact brushes movable into alinement with any one of the series of circuit terminals and arranged to make contact therewith, key-operated means for moving any of the brushes into alinement with a predetermined one of the series of circuit terminals corresponding to the key operated, and means for holding said brush in its adjusted position until contact has been established between it and the series of circuit terminals.

6. In a telegraphic transmitter, a number of series of circuit terminals representing telegraphic code characters, spaced contact brushes movable into alinement with any one of the series of circuit terminals, means for moving said brushes into alinement with the circuit terminals, means for holding the brushes in the adjusted position, and means for returning the brushes to their initial position when released from their adjusted position.

7. In a telegraphic transmitter, a series of contact brushes spaced apart a distance equal to two units, each of which units represent the telegraphic code indication known as the dot, a number of series of circuit terminals, each series representing a telegraphic code character, means for moving the brushes into alinement with any one of the different series of circuit terminals, and means for setting the brush-placing mechanism to set another succeeding brush to the brush already set a distance therefrom equal to the space comprised in the number of units representing the character for which the first brush was set plus the number of units representing a predetermined time space between the characters to be transmitted.

8. In a telegraphic transmitter, a number of series of circuit terminals representing telegraphic code characters, a rotative carrier, contact brushes thereon normally in position to be out of alinement with the aforesaid circuit terminals but movable on said carrier to positions in alinement with any one of the series of circuit terminals, means for moving said brushes to predetermined extents to bring them into alinement with the desired series of circuit terminals, pawl-and-ratchet retaining means for said brushes, and springs for returning said brushes to their initial position when released from the retaining pawls.

9. In a telegraphic transmitter, a circular series of axially-movable contact brushes, rotatable means for engaging any of said brushes, keys and connections between the same and the rotatable means for moving the latter into engagement with and setting the brushes axially to a predetermined extent, and other means between said keys and said rotatable means for effecting a rotation of said rotatable means to an extent commensurate with the number and length of the circuit terminals representing the particular code characters to be transmitted plus a predetermined time element or space between the transmission of said characters.

10. In a telegraphic transmitter, a number of series of circuit terminals representing telegraphic code characters, a rotatable series of contact brushes, each movable axially into alinement with any one of the series of code-character terminals, and means for effecting the adjustment of the brushes to the desired extent comprising a rack movable in the same axial direction as the brushes and into contact therewith, a series of keys, means engaged by said keys and adjusted to vary their effective movement in accordance with the character to be controlled by said keys, and connections between said key-adjusting means and the aforesaid brush-actuating rack.

11. In a telegraphic transmitter, a number of series of circuit terminals representing telegraphic code characters, a circular series of brushes normally out of the path of said circuit terminals but movable into alinement therewith, rotatable racks arranged to engage said brushes, operating keys, connections between said keys adjusted for the actuation of said racks to the extents commensurate with the position of the series of contacts representing the code character for each individual key, and means under the control of said keys for rotating said racks to an extent commensurate with the time limit of the code character plus a predetermined time limit of space between code characters.

12. In a telegraphic transmitter, a number of series of circuit terminals representing telegraphic code characters, a number of consecutively-arranged contact brushes movable into alinement with any of the series of circuit terminals, keys and connections for moving the brushes to the desired extent to close the circuit with the series of terminals representing the character indicated by the key, and means for mechanically determining the spaces between active brushes comprising a rotatable element movable by the keys to adjust any one of the brushes, differentially movable actuating means for the rotatable element, and stops under the control of the keys for determining the extent of rotation of the rotatable element in accordance with the desired time space between the code characters.

13. In a telegraphic transmitter, a number of series of circuit terminals representing telegraphic code characters, a number of contact brushes adjustable with relation to said circuit terminals, and means for setting said brushes in alinement with the circuit terminals and in such time relation with each other as to their contact with the aforesaid circuit terminals as to throw the characteristic impulses upon the line in proper order with a predetermined time interval between the impulses representing the individual characters.

14. In a telegraphic transmitter, a number of series of circuit terminals representing telegraphic code characters, a number of equally spaced brushes arranged for contact with the circuit terminals, key-operated means for moving the brushes into alinement with the desired series of circuit terminals, means under the control of the keys for actuating in succession contact brushes sufficiently remote one from the other to engage each its respective series of circuit terminals in regular order with a predetermined time interval between each series representing a telegraphic code character, and means for moving the brushes to and over the circuit terminals at a different predetermined speed.

15. In a telegraphic transmitter, a series of keys representing telegraphic code characters and all having the same extent of movement, contact brushes, series of circuit terminals representing telegraphic code characters, means for moving said contact brushes to different extents to coincide with said circuit terminals, connections with said operating means for the brushes under the control of the keys, and other connections interposed between the keys and the brush-operating mechanism comprising bars with inclined engaging faces in the paths of said keys whereby each key acting on a bar has a different length of movement before engaging said bar.

16. In a telegraphic transmitter, a spacing mechanism comprising an escapement having a total movement commensurate with the longest telegraphic character, and means under the control of each key for adjusting said escapement to an extent commensurate with the length of the character represented by said key.

17. In a telegraphic transmitter, an escapement consisting of two members having a definite range of movement, one having idle movement and the other having effective movement, and stop members under the control of the keys for releasing the idle member to move a distance equal to the full movement less the movement necessary to cover the length of a character and its following space and then to release the effective member to move a distance equal to the balance of the full movement.

18. In a telegraphic transmitter, an escapement mechanism having a definite range of movement and comprising one member having an idle movement and another member having an effective movement, which movements are together equal to the full movement of the escapement, and means under the control of the keys for effecting such movements comprising a number of bars each engaged by certain only of the keys and connections between these bars and the escapement mechanism whereby each bar controls the escapement mechanism to a different extent.

19. In a telegraphic transmitter, a spacing escapement having a definite total movement corresponding to the longest telegraphic character and having its shortest movement equal to four times the length of the shortest telegraphic character or four units, and a number of key-operated connections to said spacing escapement for operating the latter to different extents from four times the length of the shortest telegraphic character, in multiples of two units, up to the length of the longest character.

20. In a telegraphic transmitter, a series of rotatable contact brushes, each movable in a plane at right angles to its plane of rotation, and means for setting each brush in its plane of movement at right angles to its plane of rotation, commensurate with the character to be transmitted by said brush.

21. In a telegraphic transmitter, a series of rotatable contact brushes, each movable in a plane at right angles to its plane of rotation and each comprising a body portion elongated in the plane of its individual movement and having series of ratchet teeth and each brush provided with an elastic contact finger, and means for holding each brush in the adjusted position to which it is individually moved.

22. In a telegraphic transmitter, a series of rotatable contact brushes, each individually adjustable in a plane at right angles to its plane of rotation, detents for holding the brushes in their adjusted position against the action of a force tending to return them to their initial position, series of circuit terminals representing telegraphic code characters and arranged in the paths of the brushes when in their adjusted positions, and means adjacent to said circuit terminals for releasing the detents and permitting the brushes to return to their initial position.

23. In a telegraphic transmitter, a rotatable series of brushes adjustable to different planes of rotation, series of circuit terminals representing telegraphic code characters in the paths of the brushes when in their adjusted positions, and means under the control of an operator for releasing the brushes after having passed the circuit terminals.

24. In a telegraphic transmitter, a rotary series of contact brushes adjustable to different planes of rotation, series of circuit terminals representing different telegraphic code characters, and means coacting with the brushes when passing the circuit terminals to prevent the individual adjustment of said brushes during that portion of their travel.

25. In a telegraphic transmitter, a contact-brush holder comprising a rotatable cylinder having peripheral slots arranged with the axis of said cylinder, and brushes carried by said cylinder and movable longitudinally in said slots.

26. In a telegraphic transmitter, a rotatable cylinder having peripheral slots parallel with the axis of said cylinder, brushes seated in said slots and movable longitudinally therein and provided on their outer edges with radial teeth, and pawls carried by said cylinder and arranged to engage the teeth in the brush bodies.

27. In a telegraphic transmitter, a rotatable cylinder, peripheral slots therein parallel with the axis of the cylinder, brushes having their body portions in said slots and provided with radially extending brush fingers, detents for holding said brushes in adjusted position in said slots, and a contact ring on said cylinder for including said brushes in an electric circuit.

28. In a telegraphic transmitter, a spacing mechanism comprising an escapement having a total movement commensurate with the longest telegraphic character, means under the control of each key for adjusting said escapement to an extent commensurate with the length of the character represented by said key, and a spacing bar for producing spaces between words, acting on the escapement to adjust the latter to a predetermined extent irrespective of the adjustment of the escapement by the character keys.

In testimony that I claim the foregoing as my own, I have hereto affixed my signature in the presence of two witnesses.

CLARENCE BRAIN.

Witnesses:
  ASA SMITH,
  G. F. LAWRENCE.